United States Patent
Li et al.

(10) Patent No.: US 12,440,788 B2
(45) Date of Patent: Oct. 14, 2025

(54) METHOD AND APPARATUS FOR METAL REMOVAL FROM DRINKING WATER

(71) Applicant: KX Technologies LLC, West Haven, CT (US)

(72) Inventors: William Li, Pittsburgh, PA (US); Frank A. Brigano, Northford, CT (US); Blake E. Savoy, Killingworth, CT (US); Christopher Thibeault, Wethersfield, CT (US)

(73) Assignee: KX Technologies LLC, West Haven, CT (US)

( * ) Notice: Subject to any disclaimer, the term of this patent is extended or adjusted under 35 U.S.C. 154(b) by 674 days.

(21) Appl. No.: 17/730,469

(22) Filed: Apr. 27, 2022

(65) Prior Publication Data

US 2022/0249994 A1    Aug. 11, 2022

Related U.S. Application Data

(63) Continuation of application No. 15/952,672, filed on Apr. 13, 2018, now abandoned.

(60) Provisional application No. 62/509,923, filed on May 23, 2017.

(51) Int. Cl.
*B01D 39/16* (2006.01)
*B01D 39/18* (2006.01)

(52) U.S. Cl.
CPC ....... *B01D 39/163* (2013.01); *B01D 39/1623* (2013.01); *B01D 39/18* (2013.01); *B01D 2239/025* (2013.01); *B01D 2239/0407* (2013.01); *B01D 2239/0414* (2013.01); *B01D 2239/0442* (2013.01); *B01D 2239/10* (2013.01)

(58) Field of Classification Search
None
See application file for complete search history.

(56) References Cited

U.S. PATENT DOCUMENTS

| | | | |
|---|---|---|---|
| 4,190,532 A | 2/1980 | Halbfoster | |
| 5,376,270 A * | 12/1994 | Spearman | B29C 65/08 55/497 |
| 5,472,600 A | 12/1995 | Ellefson | |
| 5,755,963 A | 5/1998 | Sugiura | |
| 6,872,311 B2 | 3/2005 | Koslow | |
| 7,390,343 B2 | 6/2008 | Tepper | |

(Continued)

*Primary Examiner* — Magali P Slawski
*Assistant Examiner* — Eric J McCullough
(74) *Attorney, Agent, or Firm* — DeLio Peterson & Curcio LLC; Kelly M. Nowak

(57) ABSTRACT

A single sheet water filter media for gravity filtration applications that improves flow performance over the product life while maintaining sufficient metal reduction, wherein at least two distinct density gradients of the single sheet form a physical barrier for capturing colloidal and insoluble contaminants, retaining the colloidal and insoluble contaminants until the contaminants become soluble in the fluid, and being removed by the single sheet filter media. The single sheet filter overcomes the difficulties of dual- and multi-layer filters attributable to slower flow rate realized well before the rated lifetime of the product. The two distinct density gradients of the single sheet filter media are created by exerting a force on a liquid slurry, such force resulting in the separation of higher powder loading and fibers that compose the top and bottom density gradients, respectfully.

19 Claims, 21 Drawing Sheets

(56) References Cited

U.S. PATENT DOCUMENTS

| | | |
|---|---|---|
| 7,655,112 B2 | 2/2010 | Koslow |
| 8,002,990 B2 | 8/2011 | Schroeder et al. |
| 9,352,267 B2 | 5/2016 | Krupnikov et al. |
| 2003/0207635 A1* | 11/2003 | Minemura ......... B01J 20/28028 442/181 |
| 2005/0011827 A1* | 1/2005 | Koslow ................. D21H 13/50 210/508 |
| 2008/0023403 A1 | 1/2008 | Rawson |
| 2009/0188870 A1* | 7/2009 | Schroeder .......... B01J 20/28007 210/663 |
| 2012/0077015 A1 | 3/2012 | Zhou |
| 2013/0030340 A1 | 1/2013 | Vincent |
| 2013/0340613 A1* | 12/2013 | Krupnikov ............. B01D 39/18 264/413 |
| 2015/0122719 A1 | 5/2015 | Lombardo et al. |
| 2016/0220927 A1 | 8/2016 | Kwok et al. |

\* cited by examiner

|  | Percent Matter |
|---|---|
| A6: Total | 65.1% |
| A6: Bottom | 66.2% |
| A6: Top | 63.9% |
| A7: Total | 69.8% |
| A7: Bottom | 73.3% |
| A7: Top | 66.2% |
| A19: Total | 56.9% |
| A19: Bottom | 62.3% |
| A19: Top | 51.6% |

FIG. 25

METHOD AND APPARATUS FOR METAL REMOVAL FROM DRINKING WATER

BACKGROUND OF THE INVENTION

1. Field of the Invention

The invention relates to water filtration, and particularly to a water filter for gravity filtration applications that improves flow performance over the product life while maintaining sufficient metal reduction, such as lead reduction. More specifically, the invention relates to a single sheet filter that overcomes the difficulties of dual- and multi-layer filters attributable to slower flow rate realized well before the rated lifetime of the product.

2. Description of Related Art

Although used in numerous consumer products, metals, such as lead, can be toxic, and are now known to be harmful to human health if inhaled or ingested. Important sources of lead exposure include: ambient air, soil, and dust (both inside and outside the home), food (which can be contaminated by lead in the air or in food containers), and water (from the corrosion of plumbing). Materials such as ion exchange resins and reverse osmosis membranes effectively reduce or fully remove dissolved ionic species. Particulate lead at high pH exists primarily as colloidal lead carbonates. These colloidal particulate solids can be physically removed if the filter media provides for a fine enough mesh that can also accommodate pressure differentials.

For many years fibers, such as cellulose fibers, have been utilized as filter aids to improve flow and reduce differential pressure across the surface of a bed or precoat. Fibers dramatically improve removal of colloidal materials, especially when used in conjunction with charged materials such as ion exchange resins.

Currently, filters are available for removing soluble, colloidal, and insoluble particles from a fluid, such as lead, using two or more filter media that are adjacent and in fluid communication with one another. For example, U.S. Pat. No. 8,002,990 issued to Schroeder, et al., on Aug. 23, 2011, titled "USES OF FIBRILLATED NANOFIBERS AND THE REMOVAL OF SOLUBLE, COLLOIDAL, AND INSOLUBLE PARTICLES FROM A FLUID," teaches a filter for removing such particles using a first filter media for filtering soluble material from the fluid, and a second filter media, adjacent and in fluid communication with the first, for creating a physical non-soluble particle barrier at the interface between the two filter media for capturing non-soluble particles, such that when retained at the interface, these particles become soluble over time in the fluid and are then removed when the fluid passes through the second filter media. In some instances, a third filter media layer may be added between the first and second filter media layers to enhance the capturing and subsequent dissolving of the physically trapped, non-soluble particles.

However, these filters have deficiencies that make them less than optimum for certain applications. For example, the multiple layers of filter media, forming multiple physical barriers to capture contaminants such as lead and other metal particulate, have experienced difficulties due to decreasing flow rate well before the expected lifetime performance duration of the filter product. The degradation in flow rate could occur in as little time as a few days to a few months of operation. Such deficiencies are better exemplified in prior art FIGS. 1-3, each figure being a line graph demonstrating the prior art dual-layer filter's failure to filter lead and other metal particulate from water at an efficient rate without quickly decreasing flow rate through the filter. Furthermore, steady flow rates are difficult to achieve in these multi-layered filter media due to the occurrence of air entrapment in the space between the first and second filter layers. When such air entrapment occurs between the layers of these prior art designs, the flow rate through such filters is drastically reduced and thus filtration efficiency is significantly hindered.

Referring to FIG. 1 of the prior art, this graph measures the percent initial flow rate (meaning amount of time to filter the related volume, where 100 represents the initial flow rate, 200 represents twice the initial flow rate, and 300 represents three times the initial flow rate, etc.) over the volume of water passed (measured in gallons). This graph shows the measurements taken after subjecting the prior art dual-layer filters to both lab water conditions and city water conditions. City water is subject to bubbling (as opposed to lab water which is substantially more "still"), which slows the flow of water down and increases the chance of air entrapment, especially between the layers of a dual filter media, such as that disclosed in U.S. Pat. No. 8,002,990, resulting in the measurements for the filter media under city water conditions being demonstratively poorer than the lab water measurements. The prior art dual-layer filters experienced a flow rate equal to nine times the initial flow rate (meaning water took nine times longer to pass through the filter) after less than 25 gallons of water passed through the filtration media. FIG. 2 of the prior art takes the same measurements described in FIG. 1, subjecting variations of the prior art dual-layer filtration media to a constant water environment.

FIG. 3 of the prior art depicts a graph measuring the lead performance efficiency of several variations of the prior art dual-layer filters. Specifically, the effluent concentration of lead (in parts per billion) is measured over the volume of water passed through the filter (in gallons). It is noted here that both variations of the A7A7 prior art (labeled "A7A7" and "A7A7_2") failed the lead performance test entirely—they were not successful in efficiently filtering lead/metal particulates from the influent. This total failure in filtration performance is due in large part to the high densities of both layers of the A7A7 configuration, as demonstrated in FIG. 25 and discussed in greater detail below. FIG. 3 thus demonstrates the need for the prior art dual-layer configuration to comprise distinct layers having different levels of porosity to achieve proper functionality (as represented by the test groups labeled "A6A7_1" through "A6A7_4").

Two potential sources for flow rate slowdown have been observed in a dual filter media configuration: a) entrapment of air around and between layers of the different filter media; and b) bio-slime growth on the surface of the filter media. These problems arise in part from having a filter media interface that physically entraps colloidal and insoluble particulates therein, and holds them indefinitely. Some colloidal particulates can resolubilize and can be released into the fluid for later filtration by the downstream filter media layer. The entrapment slows down the fluid flow.

SUMMARY OF THE INVENTION

Bearing in mind the problems and deficiencies of the prior art, it is therefore an object of the present invention to provide a single-layer filter media capable of filtering soluble particulates while entrapping insoluble particulates and holding them until they become soluble in the fluid and are subsequently filtered during fluid flow through the filter media.

It is another object of the present invention to provide a filter media capable of removing soluble, colloidal, and insoluble particulates, including lead, which does not require the formation of a filter media interface between two filter media layers.

A further object of the invention is to provide a filter media capable of removing soluble, colloidal, and insoluble particulates, including lead and other heavy metals, which improves the flow performance of a gravity filtration applications over the current prior art layered filter media designs, and deters the formation of bio-slime growth.

Still a further object of the invention is to provide a filter media capable of removing soluble, colloidal, and insoluble particulates, including lead and other heavy metals, at an efficiency equal to or greater than that of prior art dual-layer filter media while simultaneously eliminating issues of air entrapment and bio-slime growth prevalent in the prior art.

The above and other objects, which will be apparent to those skilled in the art, are achieved in the present invention which is directed to a filter for removing soluble, colloidal, and insoluble material from a fluid comprising: a container for receiving ingress fluid, and for securing and introducing a single sheet filter media to the fluid; the single sheet filter media having a gradient of at least two distinct density layers; wherein the at least two distinct density layers form a physical barrier for the colloidal material for capturing the colloidal particles; the colloidal particles being retained at the interface until becoming soluble in the fluid, passing through the physical barrier, and being removed by the single-layer filter media.

The soluble and colloidal material may include lead, other heavy metals, organic contaminants, or inorganic contaminants.

Fibrillated nanofibers are utilized in the filter media, and may include cellulose or acrylic compositions. The fibrillated nanofibers comprise at least one pleated sheet of filter material.

Ion exchange beads, powder, resins, an adsorbent, zeolites, or carbon may be used in the filter media.

The at least two distinct density layers of the gradient are formed by the difference in component morphologies and composition within the filter media.

The gradient includes a high fibrous section of tightly packed fibers for capturing lead, heavy metals, colloidal, and insoluble particulates, and a fibrous loaded section having a higher active particulate loading for removing soluble contaminants. A heavy metal scavenger may be included.

The filter may further include antimicrobial agents including, but not limited to, silver, copper, Kinetic Degradation Fluxion media ("KDF"), and/or antimicrobial polymers.

In a second aspect, the present invention is directed to a method of making a dual-density filter media for removing soluble, colloidal, and insoluble material, comprising: forming a slurry of a semi-liquid mixture having a plurality of fibrillated nanofibers, active powder, and liquid; exerting a force on the slurry to draw a portion of the liquid from said slurry, such that the higher fiber content of a resultant mixture is located at a lower section of said filter media sheet, and a gradual change in composition of active powder loading to a more open structure located in an upper section of said filter media sheet; forming the resultant mixture into a pleated sheet; and incorporating the pleated sheet into a filter cartridge.

The force exerted on the slurry may be a gravitational force, a centripetal force, or a vacuum, among other things.

Ion exchange resins may be provided to the fibrillated nanofibers. The fibrillated fibers may include cellulose or acrylic nanofibers.

In a third aspect, the present invention is directed to a method of making filter media for removing soluble, colloidal, and insoluble material, comprising: forming a slurry of a semi-liquid mixture having a plurality of fibrillated nanofibers, active powder, and liquid; exerting a force on the slurry to draw a portion of the liquid from said slurry, such that the higher fiber content of a resultant mixture is located at a lower section of said filter media sheet, and a gradual change in composition of active powder loading to a more open structure located in an upper section of said filter media sheet; and forming the resultant mixture into a pleated sheet.

The pleated sheet may be further incorporated into a filter cartridge.

The force exerted on the slurry may be gravitational, centripetal, or a vacuum.

Ion exchange resins may be provided to the fibrillated nanofibers.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 25 is a table depicting the values acquired from a Scanning Electron Microscopy (SEM) analysis of the micrographs of FIGS. 19-24.

DESCRIPTION OF THE EMBODIMENT(S)

Figure 1:
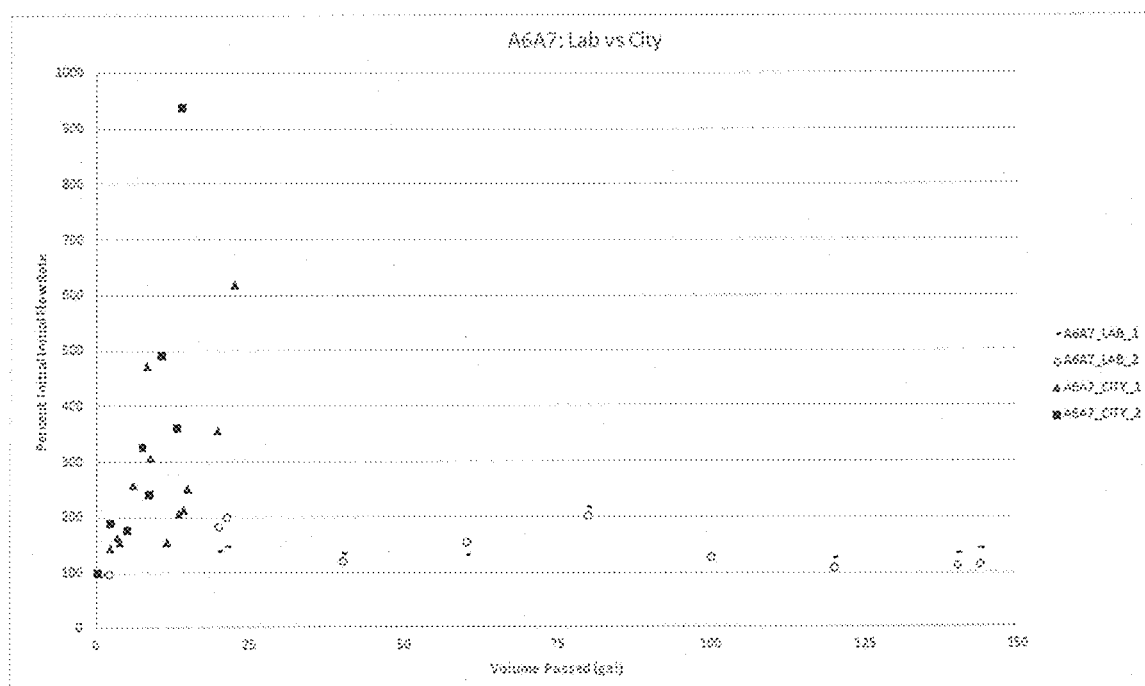
FIG. 1 is a graph depicting prior art functionality of a dual-layer filter, measuring the filter's percent initial flow rate over volume passed (per gallon) when subjected to city water and lab water environments.

In describing the embodiment(s) of the present invention, reference will be made herein to FIGS. 4-25 of the drawings in which like numerals refer to like features of the invention.

As used in this application, "nanofibers" means core fibers having diameters of less than forty (40) microns, and preferably less than 10 microns. "Fibrillation" means a physical process designed to generate fine tendrils of nanofibers attached to a main or core fiber, having a diameter preferably less than one (1) micron.

Fibrillated nanofibers offer previously unanticipated benefits in certain water treatment applications. Standard fiber types such as cellulose and acrylic may be used as starting materials for the nanofiber fibrillation process. In the nanofiber fibrillation process, the core fibers used are preferably on the order of 3.5 mm in length, although for some applications smaller lengths would be preferred, and then fibrillated to provide for many fine tendrils extending from the core.

The fibrillated nanofibers provide significant performance advantages when used in combination with other materials used currently for water treatment applications. The unique structure of the fibrillated fibers allow much higher loading of these water treatment materials than can be achieved with current technology. The loading materials may be charged or neutral species. Examples of these materials include, but are not limited to, synthetic organic and inorganic ion exchangers, zeolites, carbon, adsorbents, and metal oxides, such as titanium oxide, metal hydroxides, and other filter aids.

The present invention improves on the prior art that uses multiple physical barriers of filter paper to capture lead and other metal particulate. Once captured, in time, these particulate go into solution, and then are adsorbed by a scavenger filter layer. The necessity for two layers to form a physical barrier resulted in flow rate issues due in part to air build-up between the layers. Furthermore, once the media of the prior art was wetted, it became extremely difficult for air to escape from the layers at low operating pressures, for example at 4" of water ($H_2O$).

The requirements for the removal of colloidal lead are dictated in part by an aggressive NSF lead protocol, which requires the removal of lead in low pH treated challenge water, as well as high pH treated challenge water. Although the NSF/ANSI (National Sanitation Foundation/American National Standards Institute) protocol is a governing procedure in the industry for contaminant removal in drinking water, it is not the only procedure, and the present invention can be adjusted to accommodate other contaminant removal protocols that may be different or more or less stringent than the NSF/ANSI standard.

The present invention is directed to a filter media formulation, particularly including fibrillated nanofibers, that allows a single filter sheet solution. The single filter sheet includes a cross-sectional gradient formed by the difference in component morphologies and composition within the filter media, forming at least two distinct density layers. It provides the unexpected result of improving flow rate and filter life by employing only one filter media sheet (a single layer media) that is capable of removing soluble, colloidal, and particulate lead or other heavy metals. The prior art provides for approximately eighty (80) gallons of filtration life, while the present invention can accommodate much more (on the order of at least twice as much), while still maintaining a constant flow rate.

Steady flow rates are more difficult to achieve in the prior art design than in the design of the present invention due to issues stemming from air entrapment between the two or more layers of filter media in such prior art designs. The unexpected result of utilizing one sheet rather than a multiple layer design makes any such air entrapment negligible; thus, flow rate is improved and filter life is extended.

Additionally, microbiological growth has also been shown to inhibit flow rate. By incorporating anti-microbiological treatments, such as silver, copper, or other treatments, microbial growth is prevented and product life is further enhanced. This is especially evident in a single layer design, where bio-slime cannot accumulate at an interface between layers of a filter media.

The single layer filter media of the present invention is designed with a gradient of a high fibrous "tight" section or area which captures lead, colloidal, and insoluble particulates, and a "fibrous loaded" section or area with a higher particulate loading for soluble contamination reduction.

In this manner, the invention is characterized by a single sheet filter media having a higher basis weight and higher concentration of active media powders (carbon, heavy metal scavengers, and/or metal oxides, among other things) than filter media of the prior art.

When NSF treated challenge water passes through the single-layer filter media, the demarcation between the tight section and the fibrous loaded section stops the travel of particulate lead, and prohibits particulate lead from passing through. The particulate or colloidal lead is trapped within the gradient transition of the single-layer filter media.

The predisposition of particulate or colloidal lead is ultimately to transform into soluble solution that can then be adsorbed by the filter media. Consequently, the treated challenge water becomes soluble with lead by solubilizing the colloidal lead until all of the particulate lead trapped at the gradient transition is absorbed into the treated challenge water.

During the wet-laid production process of the filter media of the present invention, a slurry initially forms a fibrous mat to capture active powders. In this process, a higher concentration of fibrillated cellulose is utilized. This accumulation of active powders can be process-controlled to some degree through the introduction of a force applied to the slurry, such forces including (but not limited to) a vacuum, centripetal force, or the presence of gravity over time.

The higher concentration of fibrillated cellulose in the initial mat produces a tighter structure due to the fibrous morphology of the fibers. There is a gradual increase in the concentration of the powdered components of the media after the initial mat is formed.

The roughly spherical morphology and mesh size of the powders allows for a more open media structure. This accommodates the resolubilization of heavy metal particulate and subsequent adsorption by heavy metal scavengers.

In addition, media with anti-microbial activity may also be added to the formulation to impede the formation of bio-slime/bio-film on the surface of the media.

Figure 2:
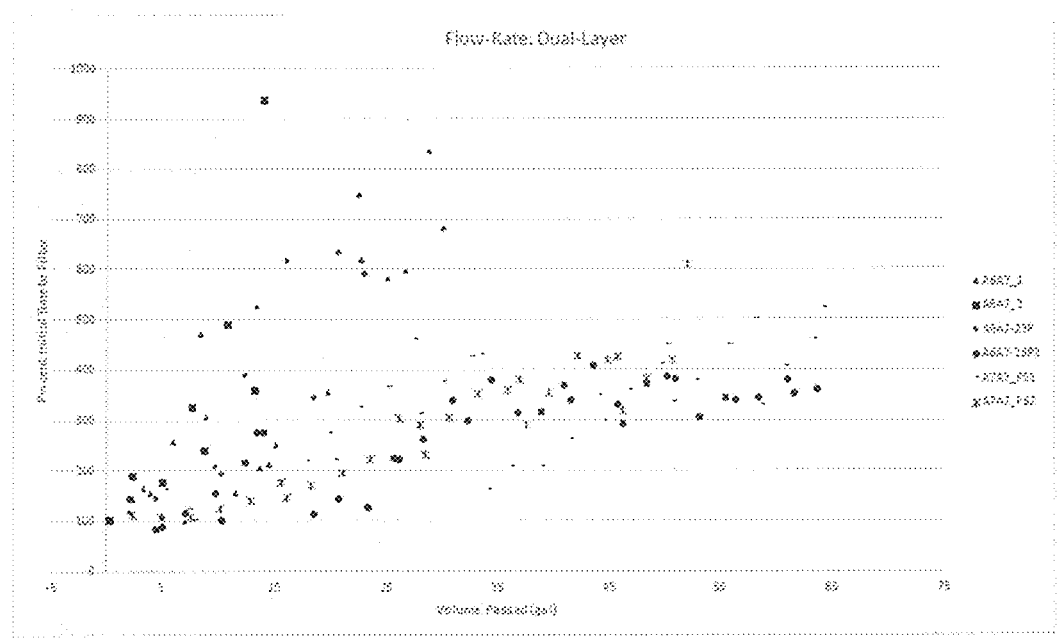
FIG. 2 is a graph depicting prior art functionality of multiple configurations of dual-layer filters, measuring each filters' percent initial flow rate over volume passed (per gallon)
Figure 3:
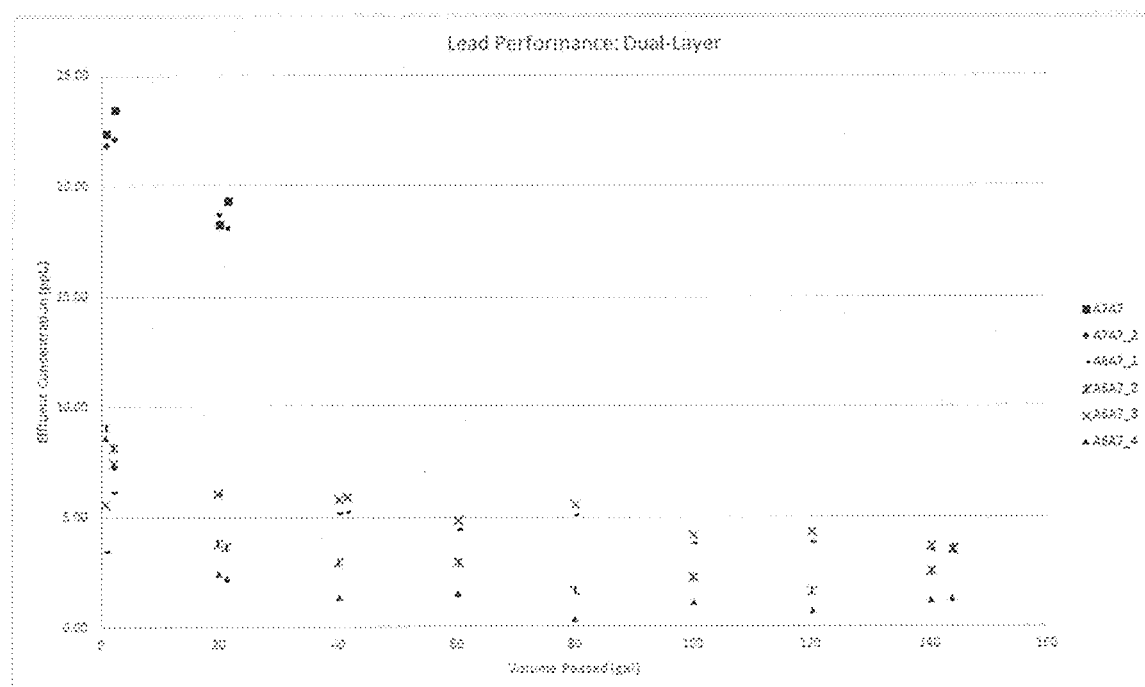
FIG. 3 is a graph depicting prior art functionality of dual-layer filters, measuring each filters' effluent concentration (parts per billion) over volume passed (per gallon)
Figure 4:
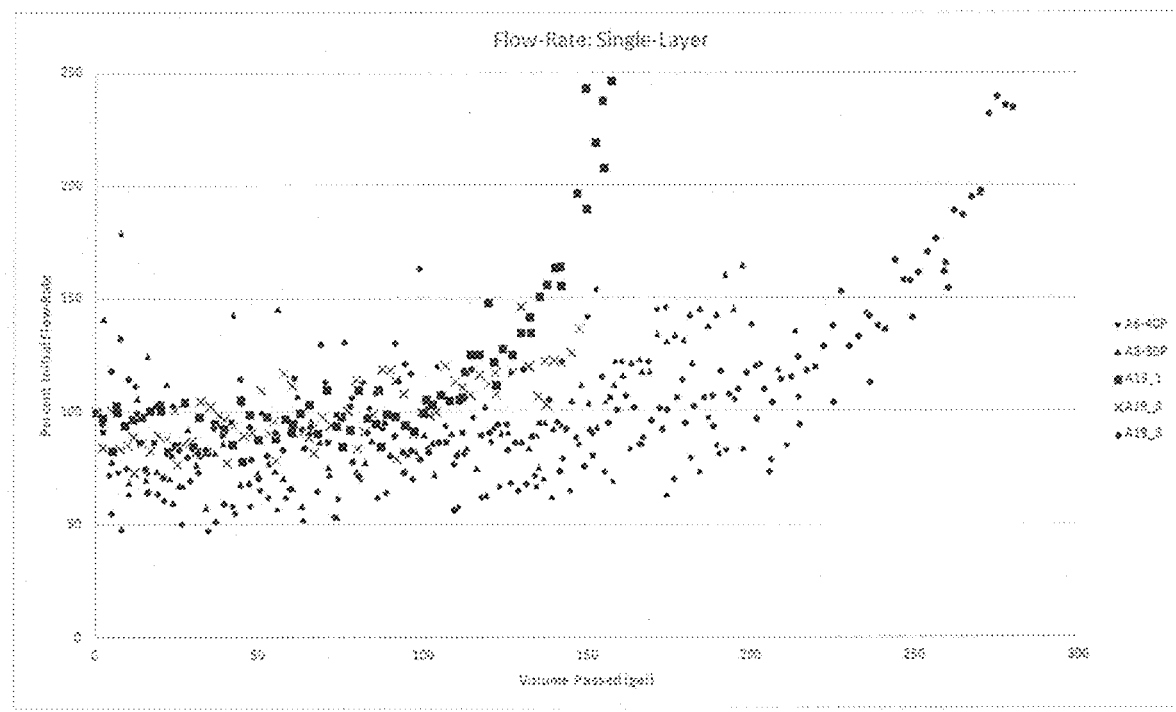
FIG. 4 is a graph depicting functionality of the single-layer filter of the present invention compared to other filters, measuring each filters' percent initial flow rate over volume passed (per gallon)

FIG. 4 is a line graph demonstrating the flow rate of various single-layer samples compared against three single-layer filter embodiments of the present invention. The first and third embodiments of the single-layer filter of the present invention (labeled as "A19_1 and A19_3") are shown to have considerably lower ratios of flow rate percentages over volume of water passed (per gallon) when compared to the other single-layer samples tested (respectively labeled as "A6-40P" and "A8-30P"). This indicates that the single-layer filters of the present invention allow for many more gallons of water to pass through the filter before seeing a spike in initial flow rate percentage than the other non-related single-layer filters (or dual filter medial layers), with such spike indicating a progressively slower overall flow of liquid through the filter in question. When comparing the graph of FIG. 4 to the prior art graph of FIG. 2 (measuring the same performance parameters of dual-layer filters), it can be observed that single-layer filters show significant improvement in initial flow rate (rather than nominal value) over a much longer life span of the filter in question. This means these single-layer filters of the present invention are capable of enduring the passage of many more gallons of water at a same or substantially similar flow rate before such flow rate eventually slows.

Figure 5:
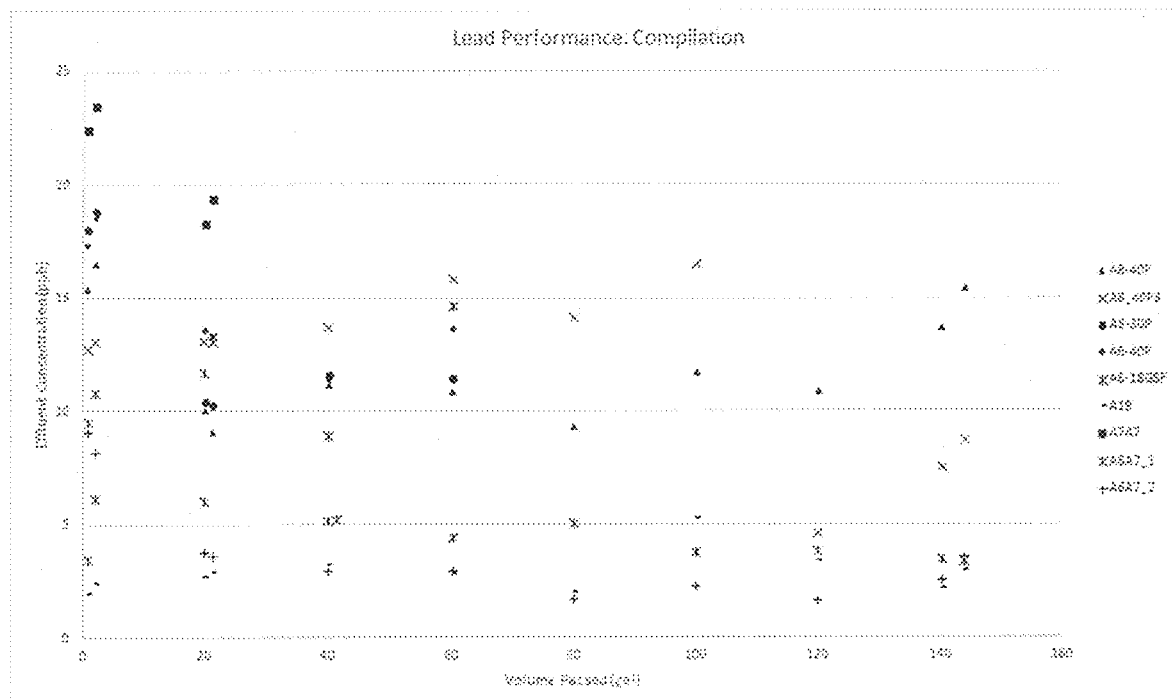
FIG. 5 is a graph depicting functionality of the single-layer filter of the present invention compared to other filters, measuring each filters' effluent concentration (parts per billion) over volume passed (per gallon)

FIG. 5 is a line graph showing lead performance of a compilation of various single-layer and dual-layer filter samples directly compared to the single-layer filter embodiment of the present invention (labeled as "A19" for purposes of FIG. 5). In particular, one dual-filter sample (labeled "A7A7" for purposes of FIG. 5) performed the poorest in lead removal when compared to the other samples. In contrast, the A19 single-layer filter embodiment of the present invention produced some of the most appealing results, specifically in terms of its measurement of effluent concentration (in parts per billion) over volume passed (per gallon). This demonstrates the present invention's superior efficiency in removing lead when compared to the other filter samples. The dual-layer filters of the aforementioned prior art (labeled as "A6A7_1" and "A6A7_2" for purposes of FIG. 5) produced results similar to that of the present invention; however, their initial flow rate ratios over volume passed (per gallon) measurements were significantly weaker than the A19 embodiment of the present invention, as further demonstrated in FIG. 7 and described in more detail below.

Figure 6:
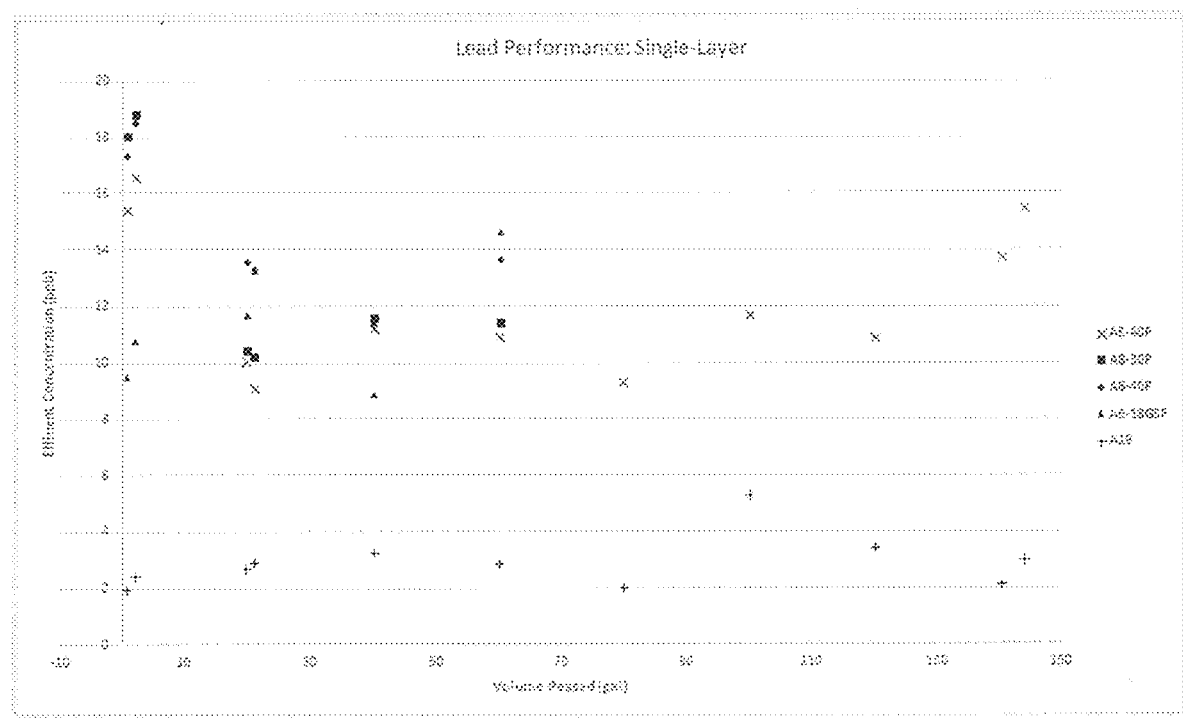
FIG. 6 is a graph depicting functionality of the single-layer filter of the present invention compared to other filters, measuring each filters' effluent concentration (parts per billion) over volume passed (per gallon)

FIG. 6 is a line graph demonstrating the lead performance of various single-layer samples directly compared against the single-layer filter embodiment of the present invention (labeled as "A19" for purposes of FIG. 6). Among all the presented variations of single-layer formulations and configurations tested for lead reduction, the A19 formulation of the present invention produced the strongest lead reduction performance values (measured by effluent concentration in parts per billion over volume passed per gallon). This shows that the present invention is substantially more efficient in the removal of lead from water than other single-layer filters available today.

Figure 7:
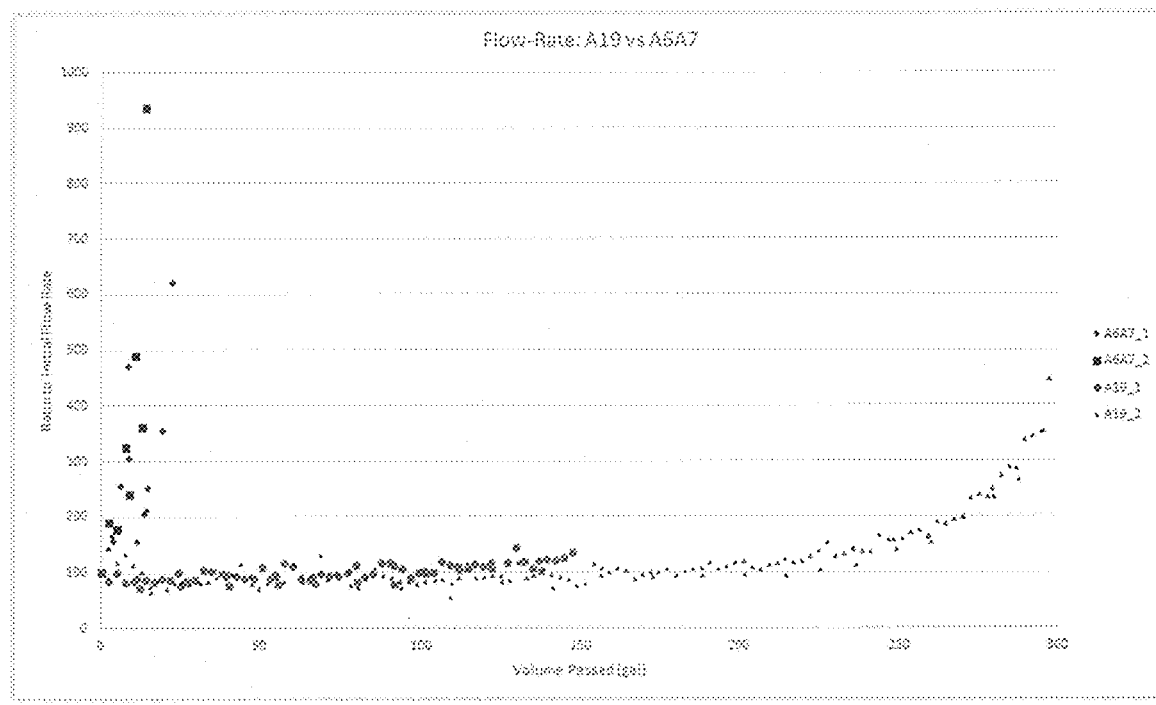
FIG. 7 is a graph comparing functionality between the prior art dual-layer filter and the single-layer filter of the present invention, measuring each filters' ratio to initial flow rate over volume passed (per gallon) with city water.

FIG. 7 is a line graph comparing the flow rates of two samples of the dual-layer filter of the prior art (labeled as "A6A7_1" and "A6A7_2" for purposes of FIG. 7, respectively) against two sample embodiments of the single-layer filter of the present invention (labeled as "A19_1" and "A19_2", respectively), with all four samples being subjected to the same city water conditions. The measurement results show the flow rate of the single-layer A19_1 and A19_2 embodiments of the present invention being substantially more stable for a much longer length of time than the dual-layer A6A7_1 and A6A7_2 samples of the prior art. Taken in conjunction with the data presented in FIG. 5, it can be shown that the single-layer media of the present invention removes lead from water at an efficiency similar to that of the dual-layer prior art, while simultaneously increasing the filter's overall performance life and maintainable initial flow rate compared to the dual-layer prior art and other applicable samples provided in FIGS. 1-8. It is important to note in this FIG. 7 that the first embodiment of the single-layer (A19_1) shows a halt in measurements after 150 gallons of water passed—this result was due to timing constraints that required putting an end to this particular testing group and not because there was any sort of failure of the filter itself. The efficiency of the single-layer filter of the present invention is best exemplified in the second tested embodiment (A19_2), which successfully operated at a constant flow rate for nearly up to 250 gallons before it began to slow down (operating at approximately four times its initial flow rate after 300 gallons of water had passed through the filter).

Figure 8:
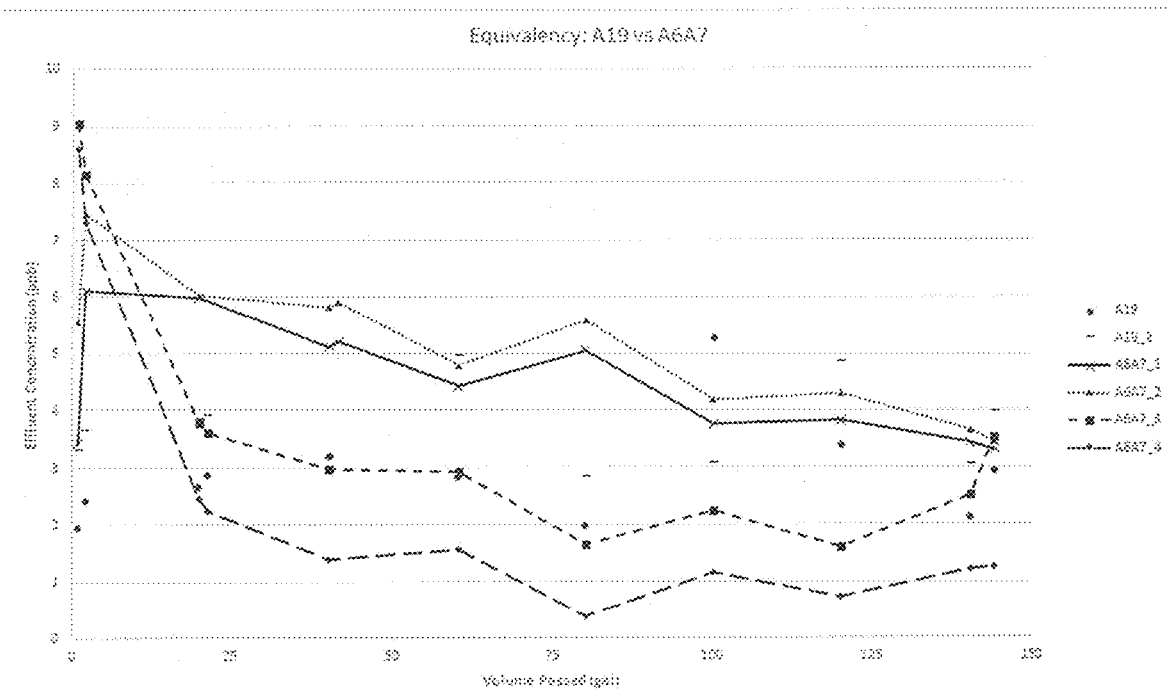
FIG. 8 is a graph comparing functionality between the prior art dual-layer filter and the single-layer filter of the present invention, measuring each filters' effluent concentration (parts per billion) over volume passed (per gallon)

FIG. 8 is a line graph comparing the lead reduction performance of four samples of the dual-layer filter of the prior art (labeled as "A6A7_1", "A6A7_2", "A6A7_3", and "A6A7_4" for purposes of FIG. 8, respectively) against two sample embodiments of the single-layer filter of the present invention (labeled as "A19" and "A19_2", respectively). All samples were held under the same test conditions (NSF/ANSI 53).

Figure 9:
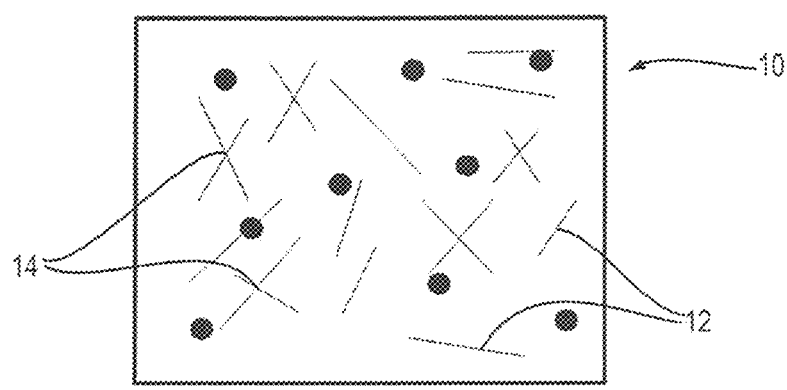
FIG. 9 depicts an annotated drawing of an initial slurry of the formation of the filter media of the present invention.

FIG. 9 depicts an annotated drawing of a portion of initial slurry of the formation of the filter media of the present invention. A slurry 10 represents a section of a semi-liquid (fluid) mixture of a pulverized solid with a liquid (usually, but not limited to, water). In this drawing, fibers 12 coexist with active powders 14 in the semi-liquid mixture. In the wet laid process, the liquid is drawn away from the slurry by either gravity or under a vacuum pressure.

Figure 10:
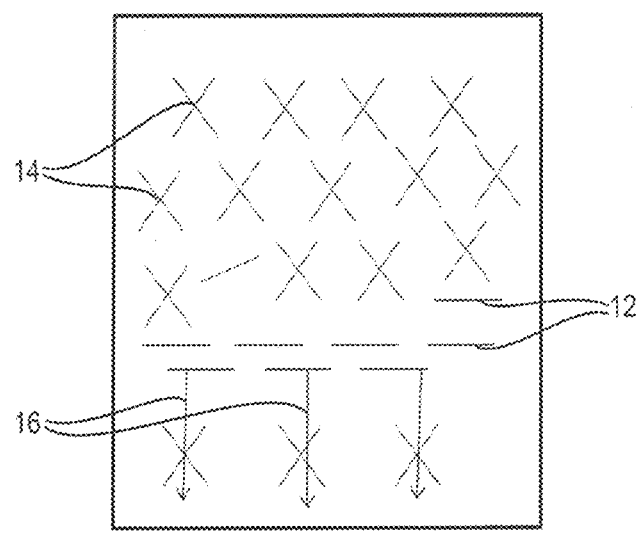
FIG. 10 depicts the initial loss of powders by a water drawn process (gravity fed or vacuum) applied to the slurry of FIG. 1.

FIG. 10 depicts the initial loss of powders 14 by this process step in the directions of arrows 16. This leaves a higher fiber content at the lower portion of the filter media, thus creating the dual-density layout of the single-filter media of the present invention. Upon completion of the process, two distinct density sections are created. Level A indicates the "tight" section or area due to the higher powder loading 18 morphology to promote particulate capture. Level B depicts the gradual change in composition of the higher powder loading 18 to a more open structure composed mostly of fibers 12 for adsorption of soluble contaminants such as, but not limited to, lead and other types of metals (see, e.g., FIGS. 11-18).

Figure 11:
FIG. 11 is a microscopic image of the filter media of the present invention showing the two separate densities that comprise the single-layer.
Figure 12:
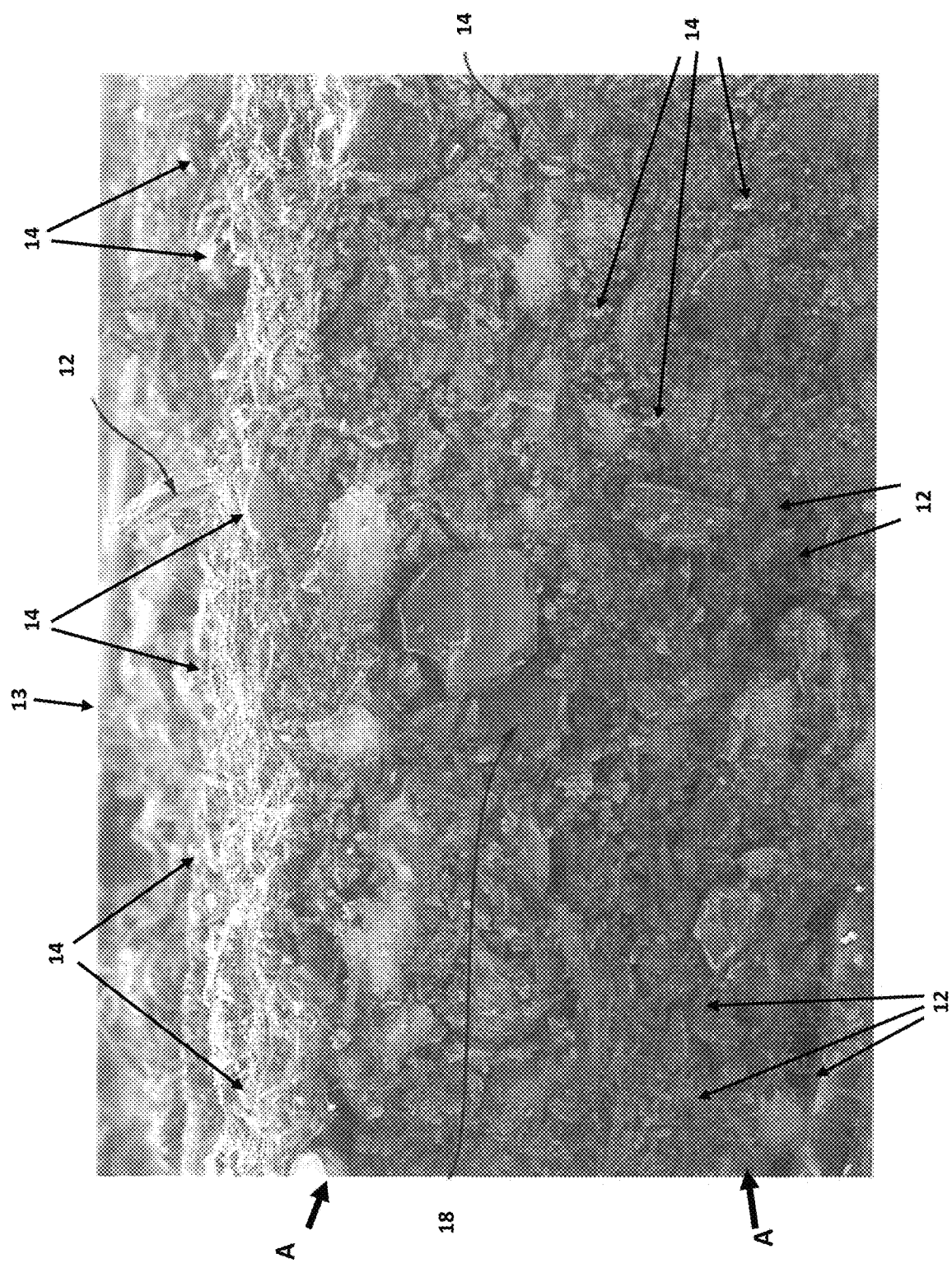
FIG. 12 is a microscopic image of the filter media of FIG. 11 showing the combined fibrillated nanofibers and active powders.

FIGS. 11-18 are microscopic images of the single-layer filter media of the present invention used to better show the compositions previously described in FIGS. 9-10. FIG. 11 denotes the "tight" section level A and "open" section level B, visibly separable by their compositions—level A is composed mainly of powders 14 and higher powder loading 18, while level B is composed mainly of fibers 12 which essentially "holds" level A directly above. FIGS. 12 and 14-17 are focused mainly on density level A to show that some fibers 12 are still integrated with powders 14 and higher powder loading 18 to maintain level A's structure.

Figure 13:
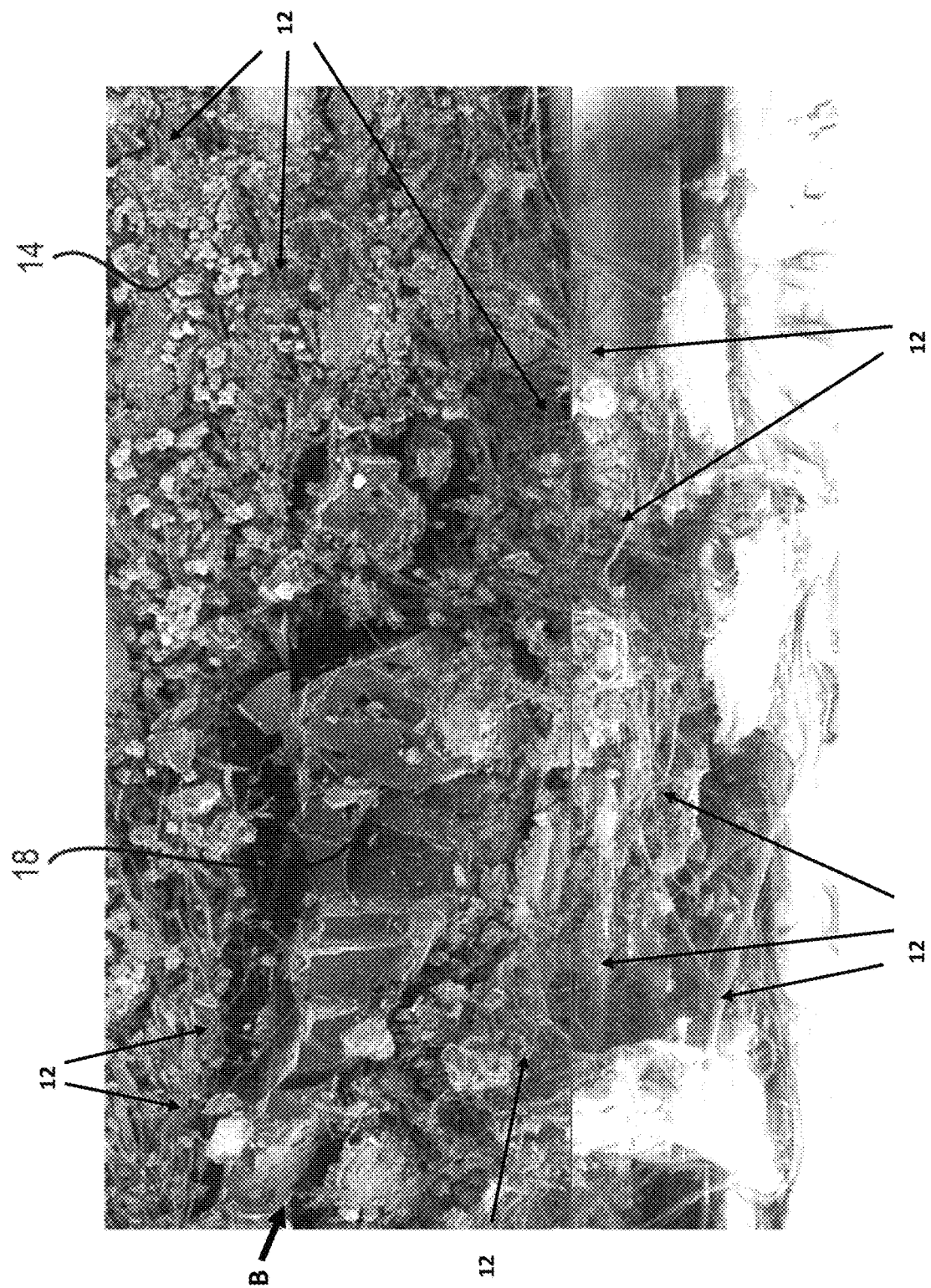
FIG. 13 is another microscopic image of the filter media of FIG. 11.
Figure 14:
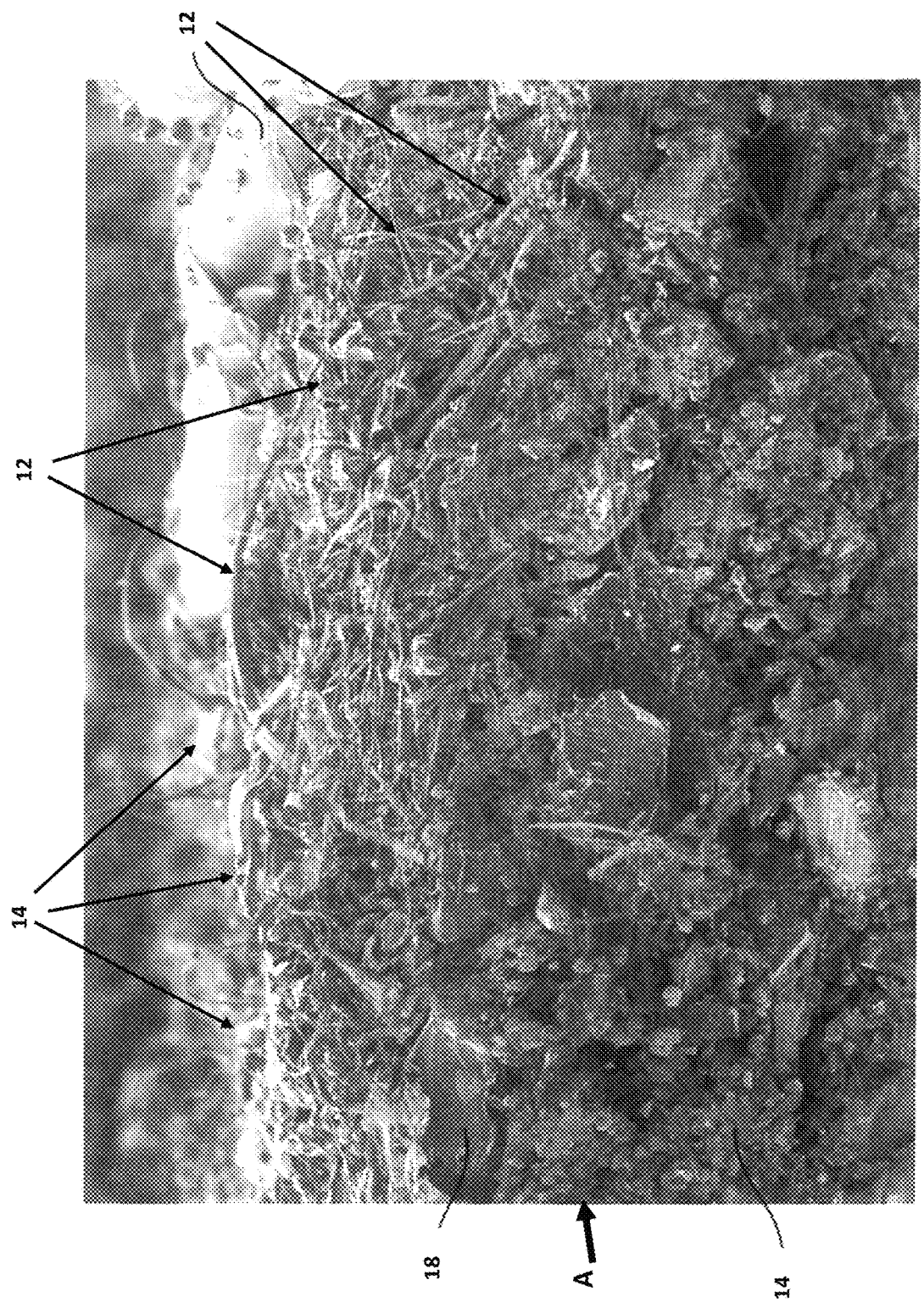
FIG. 14 is another microscopic image of the filter media of FIG. 11.
Figure 15:
FIG. 15 is another microscopic image of the filter media of FIG. 11.
Figure 16:
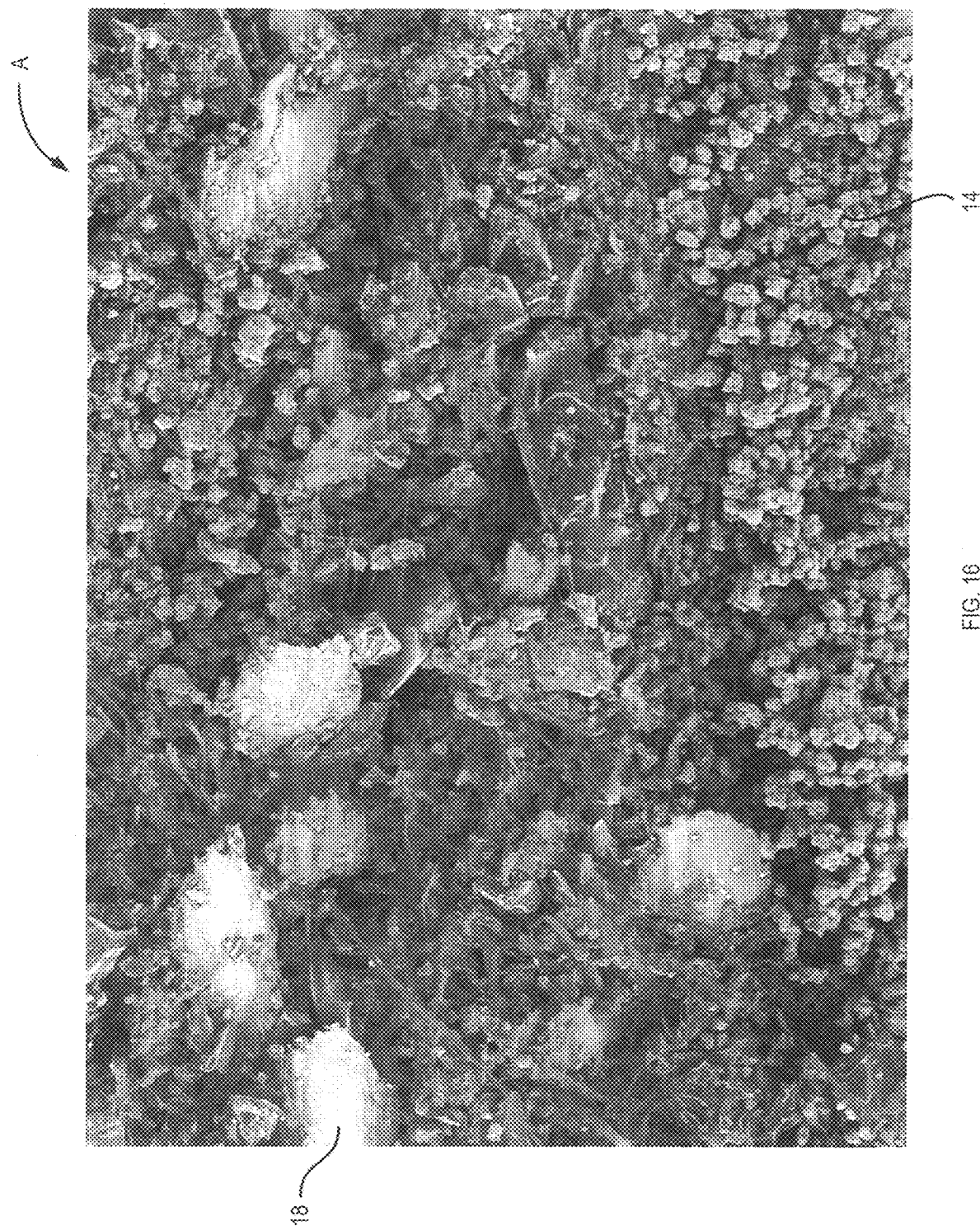
FIG. 16 is still another microscopic image of the filter media of FIG. 11.
Figure 17:
FIG. 17 is yet another microscopic image of the filter media of FIG. 11.
Figure 18:
FIG. 18 is another microscopic image of the filter media of FIG. 11 showing both densities.
Figure 19:
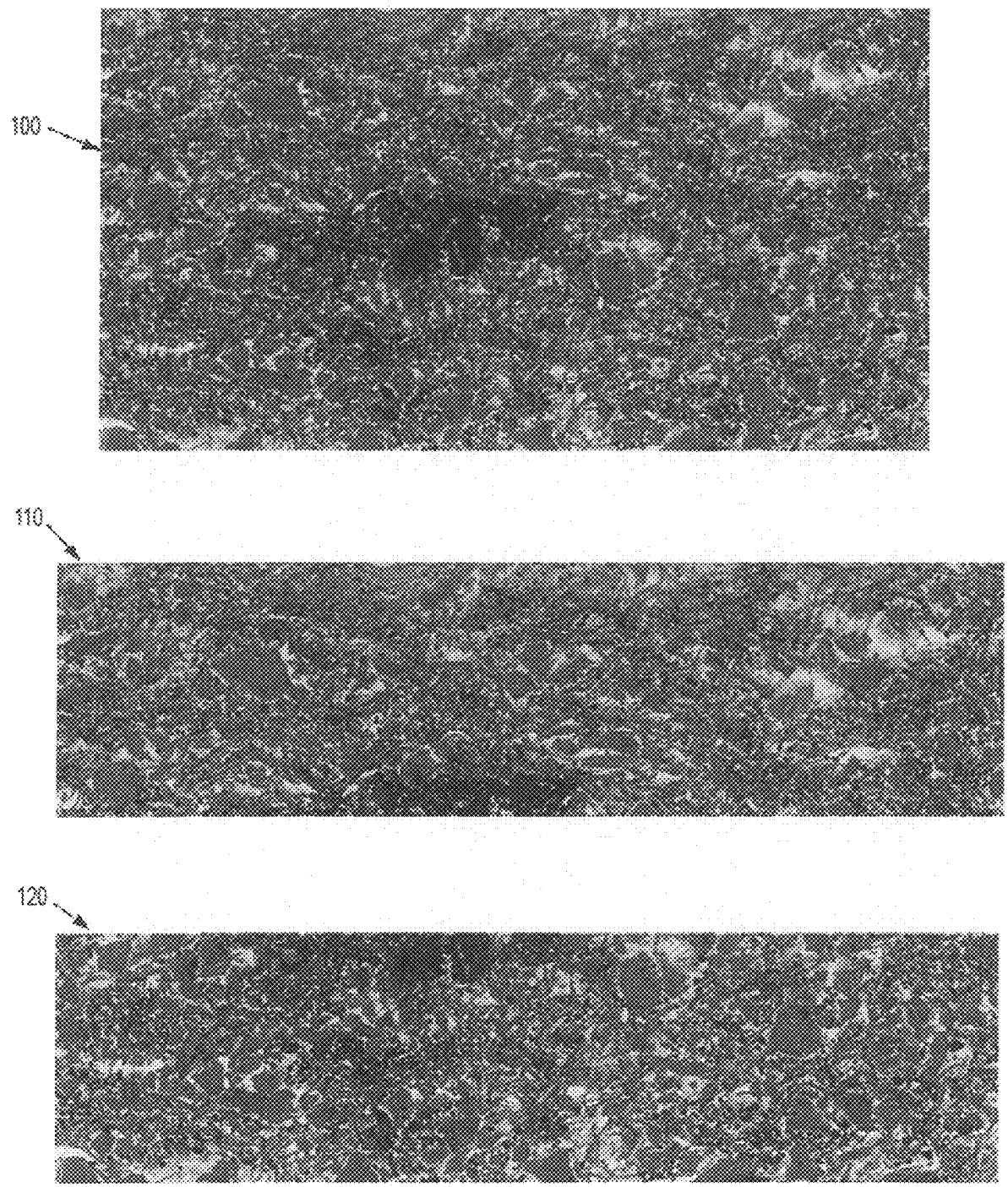
FIG. 19 is a microscopic image of the A6 prior art layer of FIG. 1, showing the total, top, and bottom portions of the filter layer from top to bottom, respectively.
Figure 20:
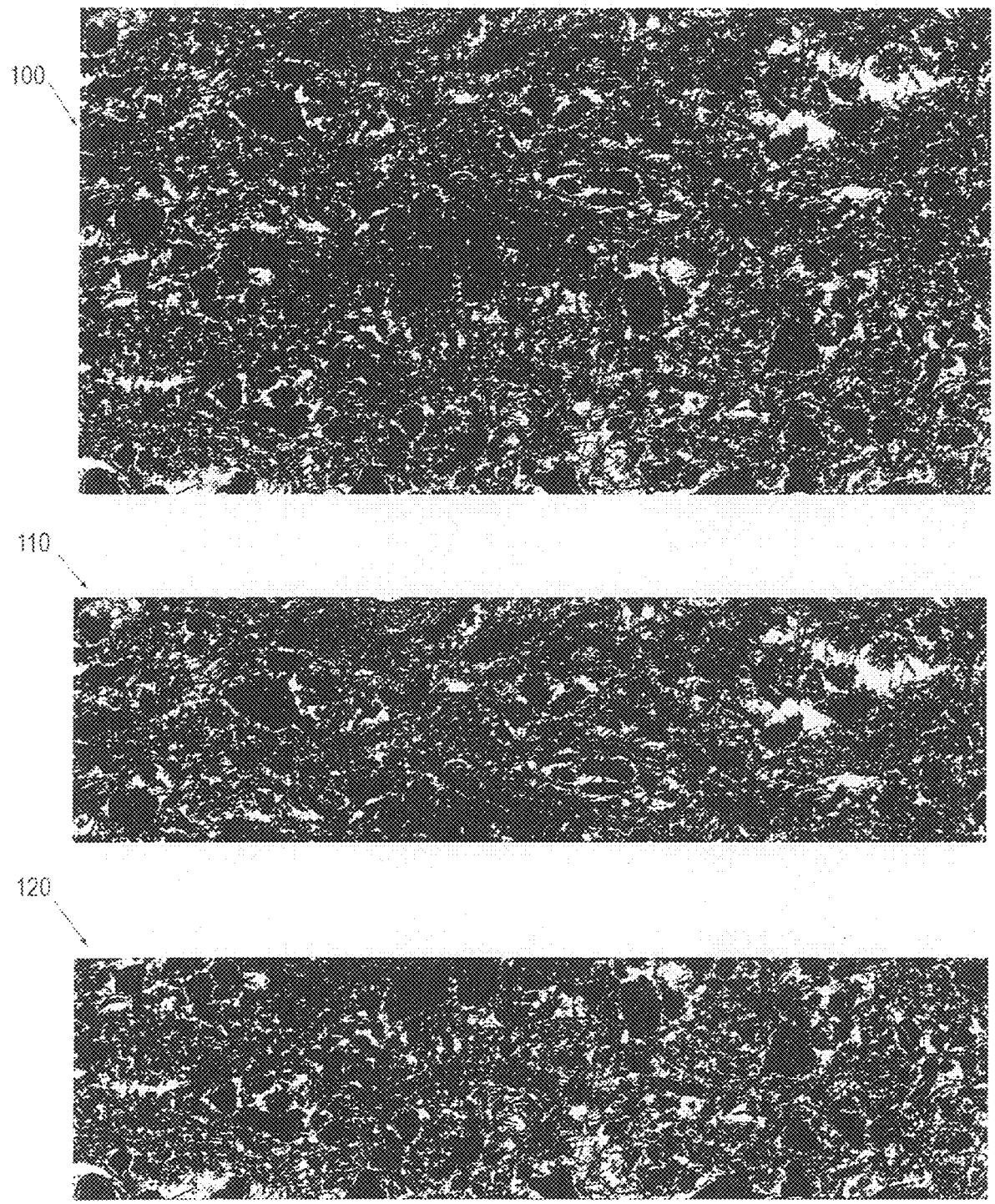
FIG. 20 is a binary conversion of the microscopic images of the A6 prior art layer of FIG. 19.
Figure 21:
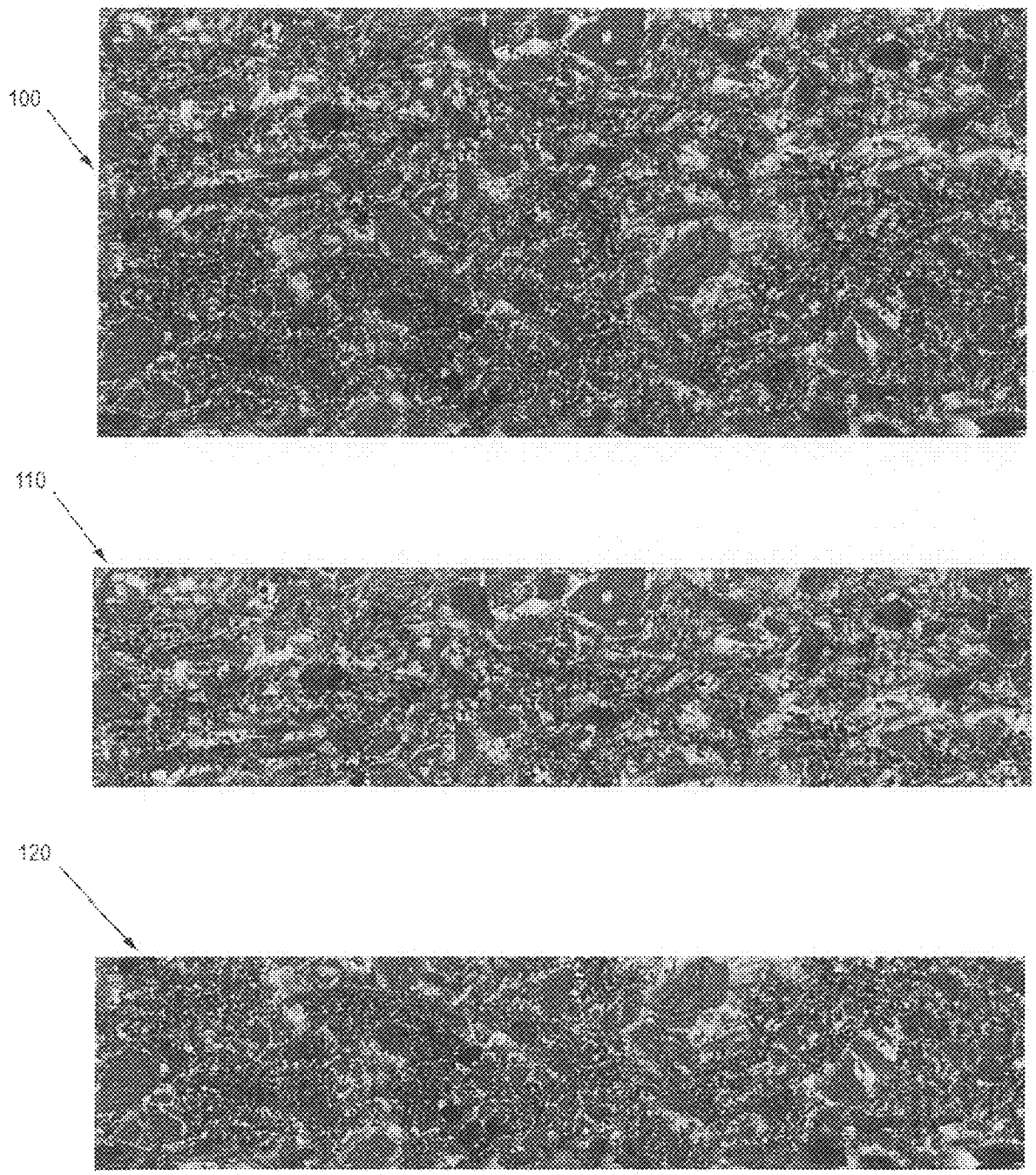
FIG. 21 is a microscopic image of the A7 prior art layer of FIG. 1, showing the total, top, and bottom portions of the filter layer from top to bottom, respectively.
Figure 22:
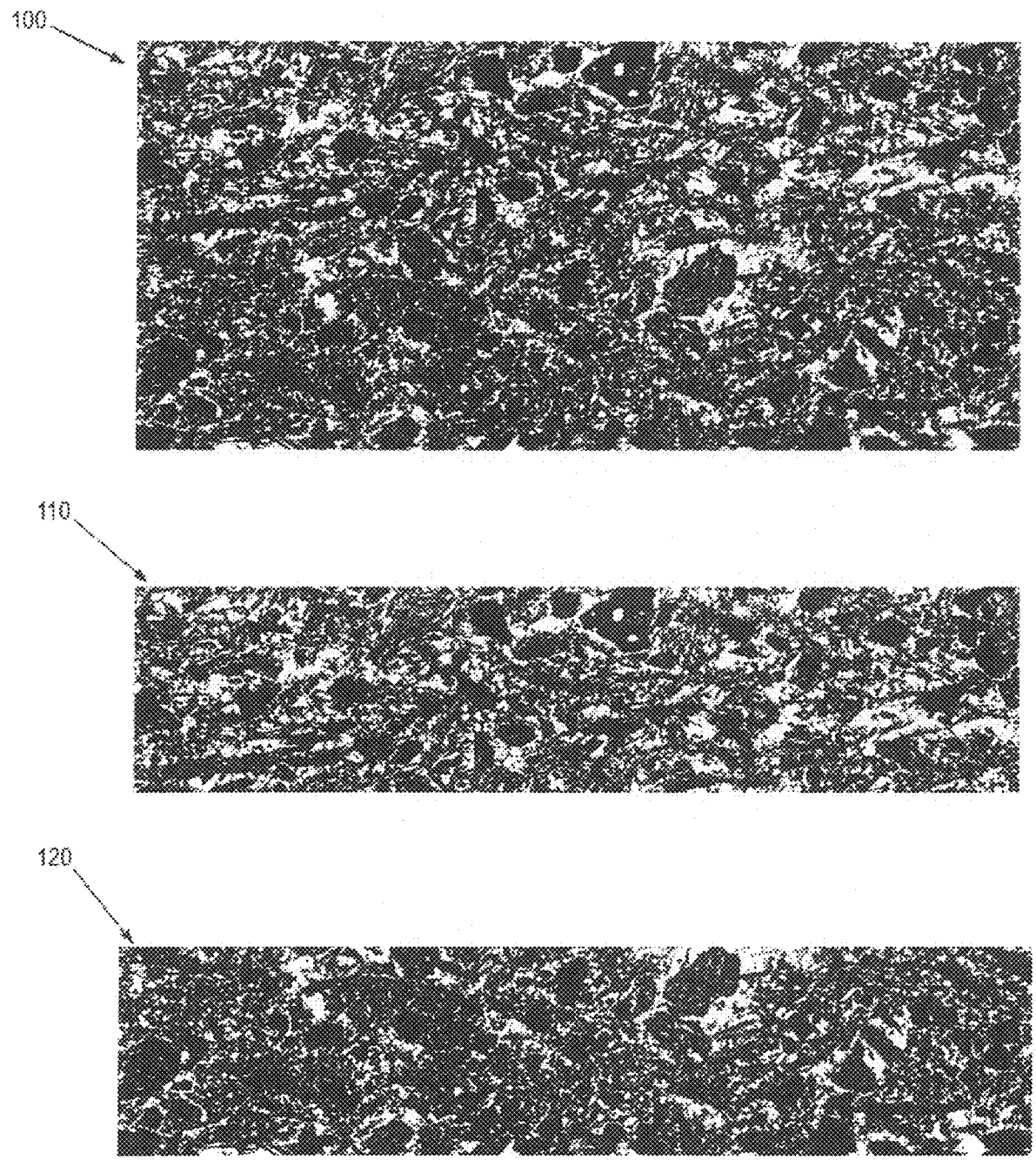
FIG. 22 is a binary conversion of the microscopic images of the A7 prior art layer of FIG. 21.
Figure 23:
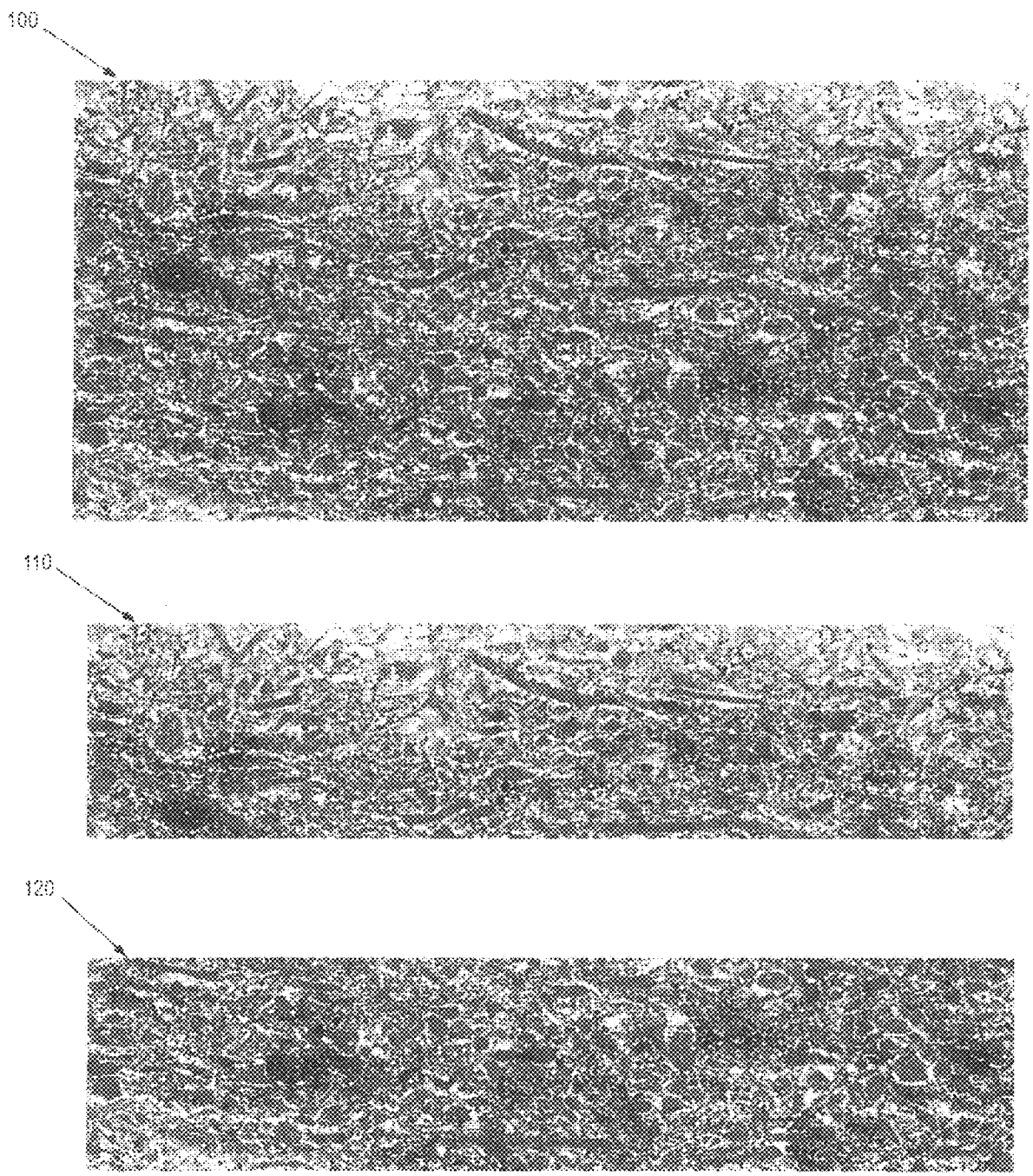
FIG. 23 is a microscopic image of the dual-density single-layer of the present invention, showing the total, top, and bottom portions of the filter layer from top to bottom, respectively.
Figure 24:
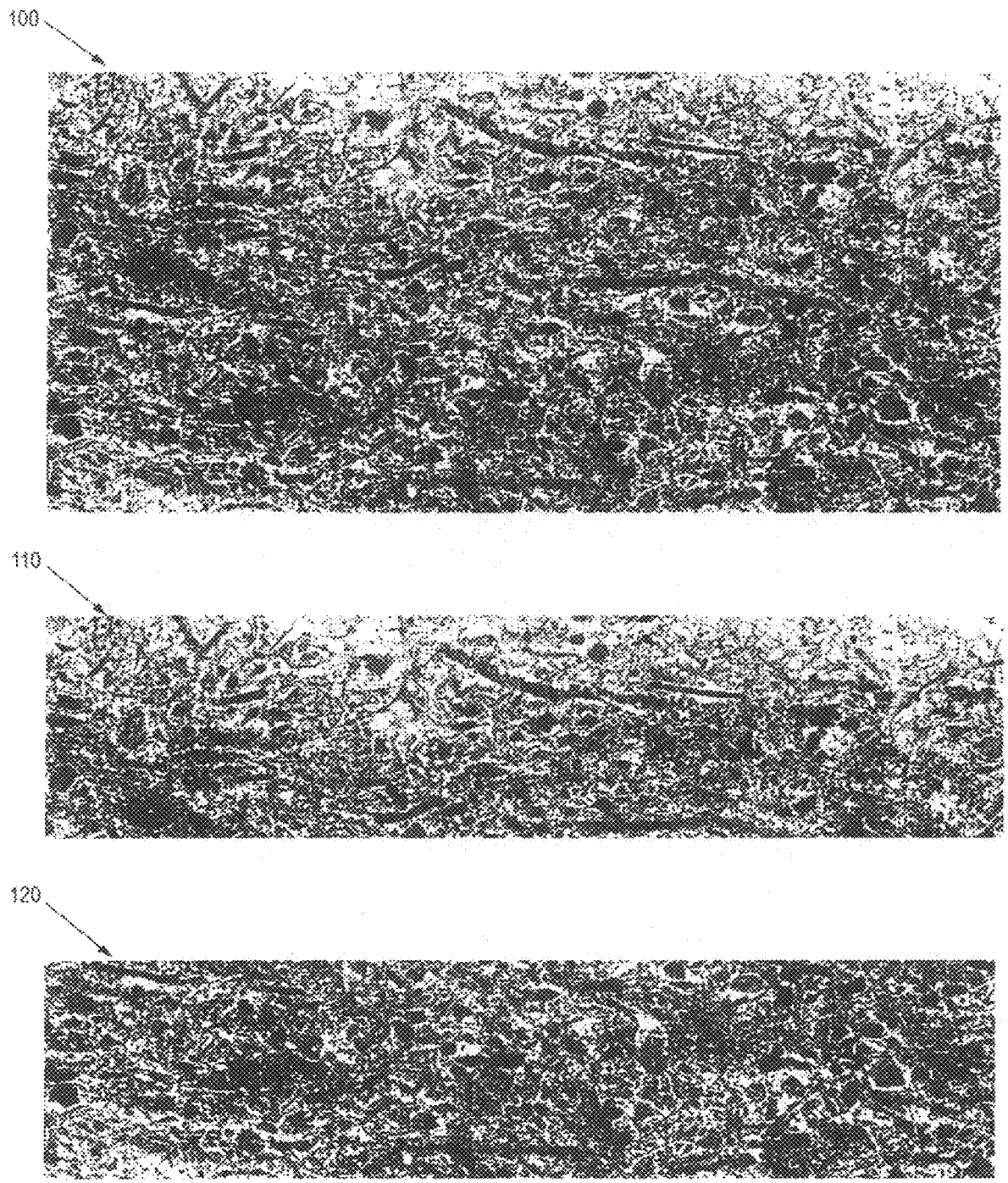
FIG. 24 is a binary conversion of the microscopic images of the dual-density single-layer of the present invention of FIG. 23.

FIGS. 13 and 18 are focused more closely on density level B, showing it is composed mostly of fibers 12 which act as a "base" for the level A density. When unfiltered water passes through this single-layer media, insoluble lead rests on or within level A, being incapable of passing through level A's mainly powder 14 composition. Over time, the insoluble lead becomes soluble due to constant exposure to flowing water, and thus becomes capable of passing through first density level A. Level B therefore performs the function of absorbing the soluble contaminants capable of passing through density level A. The result is lead reduction efficiency similar to that of the dual-layer filters of the prior art that does not sacrifice flow rate and overall filter life over a short span of time.

It has thus been shown that the present design is capable of producing a single-layer filter media for the reduction of lead (about, but not limited to, pH 8.5), without significant degradation in flow rate during gravity-fed applications unlike the dual-layer filters of the prior art.

Scanning Electron Microscopy (SEM) analysis was further performed on the present invention and on the prior art dual-layer filters (A6A7) previously discussed above. The A6A7 filter was split into its two layers (A6 for one, A7 for the other), with each layer being subjected to individual SEM testing along with the dual-density single-layer filter of the present invention. The micrographs taken and results of the SEM analysis are shown in FIGS. 19-25. The focus of the binary images of the A6 (FIG. 20), A7 (FIG. 22), and present invention (FIG. 24) demonstrates the prevalence of "voids"—or air pockets—within each filter layer and better determine each filter media's compositional gradient. To properly accomplish this, the original micrographs (FIGS. 19, 21, and 23) were converted to binary images (FIGS. 20, 22, and 24) via thresholding—a form of image segmentation. Uniform grayscale values were applied to FIGS. 19, 21, and 23, with such value being necessary to properly show all the fibers interwoven with the carbon powders and higher powder loadings. By converting these grayscale images to their binary counter parts in FIGS. 20, 22, and 24, the "voids" between the fibers and carbon particles are accurately depicted. The uniform threshold value applied to these images must be such that the "voids" are readily visible upon conversion to binary, but without detracting from the visibility of the interwoven fibers. From such binary images, the ratio of "void area" over visible matter is determined to reach the percentages shown in FIG. 25.

FIG. 25 depicts the exact measured percentages of matter present within each filter layer to demonstrate their overall density as a whole 100, from strictly a top portion 110, and from strictly a bottom portion 120. These percentages were measured by calculating the "void" area (or empty space) present in each binary micrograph (FIGS. 20, 22, and 24) then subtracting such void area percentage from 100; i.e. 100-34.9% void area=65.1% matter present in the micrograph.

Based on the information provided in FIG. 25, it can be determined that the A6 and A7 layers are generally denser in nature than the single-layer filter medium of the present invention. The SEM analysis of the present invention (FIGS. 23-25) better shows the dual-density configuration previously discussed. The top portion 110 of the single-layer of the present invention comprises a percent matter of 51.6%, which is almost 11% less dense than its bottom portion 120—having a percent matter of only 62.3%. These figures demonstrate the change in density as fluid enters through the top of the filter media and flows through the bottom. This severe change in density from top 110 to bottom 120 further contributes to the overall effectiveness of the present invention in both filtration efficiency and flow rate as previously discussed. The ideal contrast in density levels between the first density (towards the top 110 of the filter media) and the second density (the bottom 120 of the filter media) of the present invention ranges from about a ⅓-¼ differences, with the bottom portion being denser than the top portion by such a range.

In contrast, the A6 and A7 layer are both substantially denser than the present invention. The difference in density percentage between the top 110 and bottom 120 portions of the A6 and A7 layers are substantially smaller than the difference of the present invention—the A6 having a difference of just over 2%, the A7 just over 7% (compared to the 11% difference of the present invention). As a whole, the A6 layer 100 held a percent matter figure of 65.1%, and the A7 layer 69.8%. The combination of these two layers creates the A6A7 dual-layer filter media tested and mentioned prior. The A6A7 combined densities when compared to the present invention further demonstrate why the A6A7 performed very poorly in maintaining an efficient flow rate.

Thus, the present invention provides one or more of the following advantages: 1) a single-layer filter media comprising at least two densities which, when used in a filtration system, improves flow rate over the life of the filter; 2) a single-layer filter media comprising at least two densities capable of achieving stronger lead reduction performance when compared to conventional dual-layer filter media; 3) a single-layer filter media that eliminates the occurrence of air entrapment typically observed with dual-layer filter media; 4) a single-layer filter media that inhibits microbial growth due to its composition incorporating anti-microbiological treatments; and 5) a single-layer filter media comprising a roughly spherical morphology and mesh size of the powders incorporated, which allows for a more open media structure that accommodates the resolubilization of heavy metal particulate and subsequent adsorption by heavy metal scavengers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of removing contaminant materials from contaminated water comprising:
    providing a container for receiving ingress water, said container having a first container end and a second container end, said first container end for receiving said ingress water;
    providing a single-layer filter sheet comprising a base portion and a top portion separated by a density gradient that includes fibers and active particulates forming said density gradient, said active powders residing throughout an entire thickness of said single-layer filter at different concentrations within said density gradient, said top portion of said single-layer filter sheet having a first density of said density gradient and comprising a higher active particulate load and a lower fiber content than a second density of said density gradient, and said base portion of single-layer filter sheet having said second density comprising packed fiber;
    securing said single-layer filter sheet in said container with said top portion of said single-layer filter sheet having said higher active particulate load being positioned adjacent said first container end so that it is a first contact surface for said ingress water;
    introducing said ingress water into said container at said first container end and through said single-layer filter sheet whereby said ingress water makes initial contact with said first contact surface at said top portion of said single-layer filter sheet having said higher active particulate load;
    said higher active particulate load of said top portion of said single-layer filter sheet capturing and retaining said contaminant materials comprising at least colloidal and insoluble particles present in said ingress water until said colloidal and insoluble particulates become soluble contaminants; and
    passing said soluble contaminants from said top portion of said single-layer filter sheet into said base portion of said single-layer filter sheet whereby said packed fibers of said base portion remove said soluble contaminants to render a filtered egress liquid that exits the container at said second container end.

2. The method of claim 1 wherein said first density of said top portion and said second density of said bottom portion are separated from each other by a gradient transition forming a physical barrier that traps said colloidal and insoluble particulates until said colloidal and insoluble particulates become soluble contaminants passing from said physical barrier into said base portion and are removed by said packed fibers.

3. The method of claim 2 wherein said soluble contaminants are adsorbed by said packed fibers of said base portion.

4. The method of claim 1 wherein said base portion comprising said packed fibers acts as a base for said top portion and has a more open structure as compared to a top portion structure.

5. The method of claim 4 wherein said top portion comprises active powders and fibrillated fibers.

6. The method of claim 1 wherein said colloidal and insoluble particles include lead, heavy metals, organic contaminants, or inorganic contaminants.

7. The method of claim 1 wherein said fibers comprise fibrillated nanofibers.

8. The method of claim 7 wherein said fibrillated nanofibers comprise cellulose or acrylic compositions.

9. The method of claim 1 further including having ion exchange beads, powder, resins, an adsorbent, zeolites, or carbon as one of said filter media.

10. The method of claim 1 further including a heavy metal scavenger in said single-layer filter.

11. The method of claim 1 further including an antimicrobial agent including silver, copper, Kinetic Degradation Fluxion process media granules, and/or antimicrobial polymers.

12. The method of claim 1 wherein said single-layer filter sheet comprises a gravity filtration filter.

13. The method of claim 1 wherein said single-layer filter sheet is a pleated sheet of filter material.

14. The method of claim 1 wherein the first of the at least two distinct density layers has a percent matter composition approximately 10-20% less than the second of the at least two distinct density layers' percent matter composition.

15. The method of claim 1 wherein the density gradient has a contrast in density levels from the first density of said top portion to the second density of said bottom portion ranging from $1/3$-$1/4$ differences, with said bottom portion being denser than said top portion.

16. The method of claim 1 wherein the container secures and introduces the at least one single sheet filter sheet in combination with at least one other filter media.

17. The method of claim 1 wherein said first and second density layers are not separate layers joined by a bond.

18. The method of claim 1 wherein said single-layer filter sheet comprises a one-piece structure having a top surface at said top portion and a bottom surface at said bottom portion, said top surface comprises said first contact surface for said ingress water.

19. The method of claim 1 wherein said first and second density layers are not separate layers joined by a bond, thereby avoiding entrapped air between separate layers.

* * * * *